United States Patent
Huang et al.

(10) Patent No.: US 9,514,786 B2
(45) Date of Patent: Dec. 6, 2016

(54) ELECTRONIC DEVICE AND MUSIC VISUALIZATION METHOD THEREOF

(71) Applicant: HTC CORPORATION, Taoyuan, Taoyuan County (TW)

(72) Inventors: Sheng-Hsin Huang, Taoyuan (TW); Fang-Ju Lin, Taoyuan (TW); Jye Rong, Taoyuan (TW); Meng-Hsun Wu, Taoyuan (TW); Chung-Hao Huang, Taoyuan (TW); Ching-Chun Huang, Taoyuan (TW); Wei-Yi Ho, Taoyuan (TW); Wei-Hua Wu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 95 days.

(21) Appl. No.: 14/162,906

(22) Filed: Jan. 24, 2014

(65) Prior Publication Data
US 2014/0210812 A1    Jul. 31, 2014

Related U.S. Application Data

(60) Provisional application No. 61/756,487, filed on Jan. 25, 2013.

(51) Int. Cl.
| G06T 11/20 | (2006.01) |
| G11B 27/34 | (2006.01) |
| G10H 1/00 | (2006.01) |
| G11B 27/11 | (2006.01) |

(52) U.S. Cl.
CPC ............. *G11B 27/34* (2013.01); *G10H 1/0008* (2013.01); *G11B 27/11* (2013.01); *G10H 2220/011* (2013.01)

(58) Field of Classification Search
None
See application file for complete search history.

(56) References Cited

U.S. PATENT DOCUMENTS

| 7,973,230 B2* | 7/2011 | Mahowald ............ G10H 1/368 434/307 A |
| 8,168,876 B2 | 5/2012 | Hsieh |
| 8,304,642 B1 | 11/2012 | Bryan |
| 2011/0273455 A1* | 11/2011 | Powar et al. ............... 345/473 |

FOREIGN PATENT DOCUMENTS

| TW | I312117 | 7/2009 |
| TW | M362574 | 8/2009 |
| TW | 201017645 | 5/2010 |

OTHER PUBLICATIONS

Harmonix Music ("Rock Band 3 Manual—Playstation 3" http://harmonixmusic.parature.com/ics/support/DLList.asp?folderID=1819, 2010.*
Misra et al., "Sndtools: Real-Time Audio DSP and 3D Visualization," Princeton University, 2005.*
Vincent Hardy, "Animated Lyrics" Posted: Oct. 4, 2009, http://svg-wow.org/blog/2009/10/04/animated-lyrics/.*
Office Action issued in corresponding Taiwan application (dated Apr. 13, 2015).
Office Action issued in corresponding Taiwan application (dated Jun. 30, 2015).

* cited by examiner

*Primary Examiner* — Kee M Tung
*Assistant Examiner* — Nicholas R Wilson
(74) *Attorney, Agent, or Firm* — McClure, Qualey & Rodack, LLP

(57) ABSTRACT

An electronic device and a music visualization method thereof are provided. The electronic device is configured to display music visualization in response to music and change the music visualization in response to music lyrics of the music. The music visualization method is applied to the electronic device to implement the operations.

4 Claims, 9 Drawing Sheets

ELECTRONIC DEVICE AND MUSIC VISUALIZATION METHOD THEREOF

This application claims priority to U.S. Provisional Patent Application No. 61/756,487 filed on Jan. 25, 2013, which is hereby incorporated by reference in its entirety.

CROSS-REFERENCES TO RELATED APPLICATIONS

Not applicable.

BACKGROUND OF THE INVENTION

Field of the Invention

The present invention relates to an electronic device and a music visualization method thereof. More specifically, the present invention relates to an electronic device which is capable of displaying music visualization in response to music lyrics, and a music visualization method thereof.

Descriptions of the Related Art

Various electronic devices (e.g., conventional mobile phones, smart mobile phones, notebook computers, tablet computers, etc.) have become indispensable to everyday lives of modern people. Almost all electronic device manufacturers have tried to design electronic devices to keep up with consumer needs. Among these designs, combining an audio player with electronic devices has been regarded as a requirement for people over recent years.

An audio player is used to play music to provide people with an aural delight, but it cannot meet a visual enjoyment at music. Accordingly, most of the conventional electronic devices may further comprise a screen which is used to display music visualization and music lyrics in response to music. In such a way, the user may visually enjoy the music and follow it as well.

Nevertheless, in the conventional electronic devices, music visualization and music lyrics are independently and separately displayed. Therefore, there is no interaction between display of the music visualization and that of the music lyrics. Consequently, display of the music visualization and that of the music lyrics are not synchronous and coordinated in response to music so that the music visualization and the music lyrics cannot be appropriately combined to visually reflect the music. In view of this, an urgent need exists in the art to provide a solution to the problem.

SUMMARY OF THE INVENTION

The primary objective of the present invention is to provide a solution to the aforesaid problem in which the music visualization and the music lyrics cannot be appropriately combined to visually reflect the music. To achieve the objective, the present invention provides an electronic device which is capable of displaying music visualization in response to music lyrics, and a music visualization method thereof. According to the present invention, display of the music visualization is dependent on variations of display of the music lyrics, and such implement is utilized to synchronize and coordinate the music visualization and the music lyrics in response to music. In such a way, the music visualization and the music lyrics can be appropriately combined to visually reflect the music.

In accordance with an aspect of the present invention, there is provided an electronic device comprising a screen and a processor coupled with the screen. The screen is configured to display music visualization in response to music. The processor is configured to change the music visualization in response to music lyrics of the music.

In one embodiment of the electronic device, the music lyrics may comprise a plurality of sentences and the screen displays the sentences and the music visualization in three-dimensional space with time. The processor may change the music visualization in response to display position of each of the sentences. Also, the processor may change the music visualization in response to display period of each of the sentences.

In one embodiment of the electronic device, the music visualization may further comprise a plurality of visual patterns corresponding to different frequency components of the music and the processor may further adjust each of the visual patterns according to volume of the corresponding frequency component to change the music visualization.

In one embodiment of the electronic device, the electronic device may further comprise an audio module for providing the music.

In accordance with another aspect of the present invention, there is provided a music visualization method for use in an electronic device comprising a processor coupled. The method comprising the following steps of:
(a) displaying music visualization by a screen in response to music; and
(b) changing the music visualization by the processor in response to music lyrics of the music.

In one embodiment of the music visualization method, the music lyrics may comprise a plurality of sentences and the screen displays the sentences and the music visualization in three-dimensional space with time. The processor may change the music visualization in response to display position of each of the sentences. Also, the processor may change the music visualization in response to display period of each of the sentences.

In one embodiment of the music visualization method, the music visualization may further comprise a plurality of visual patterns corresponding to different frequency components of the music and the processor may further adjust each of the visual patterns according to volume of the corresponding frequency component to change the music visualization.

In one embodiment of the music visualization method, the electronic device may further comprise an audio module for providing the music.

The detailed technology and preferred embodiments implemented for the present invention are described in the following paragraphs accompanying the appended drawings for people skilled in this field to well appreciate the features of the claimed invention.

DESCRIPTION OF THE PREFERRED EMBODIMENT

The present invention can be explained with reference to the following embodiments. However, these embodiments are not intended to limit the present invention to any specific environments, applications or implementations described in these embodiments. Therefore, the description of these embodiments is only for the purpose of illustration rather than to limit the present invention. In the following embodiments and attached drawings, elements not directly related to the present invention are omitted from depiction; and dimensional relationships among individual elements in the attached drawings are illustrated only for ease of understanding but not to limit the actual scale.

Figure 1:
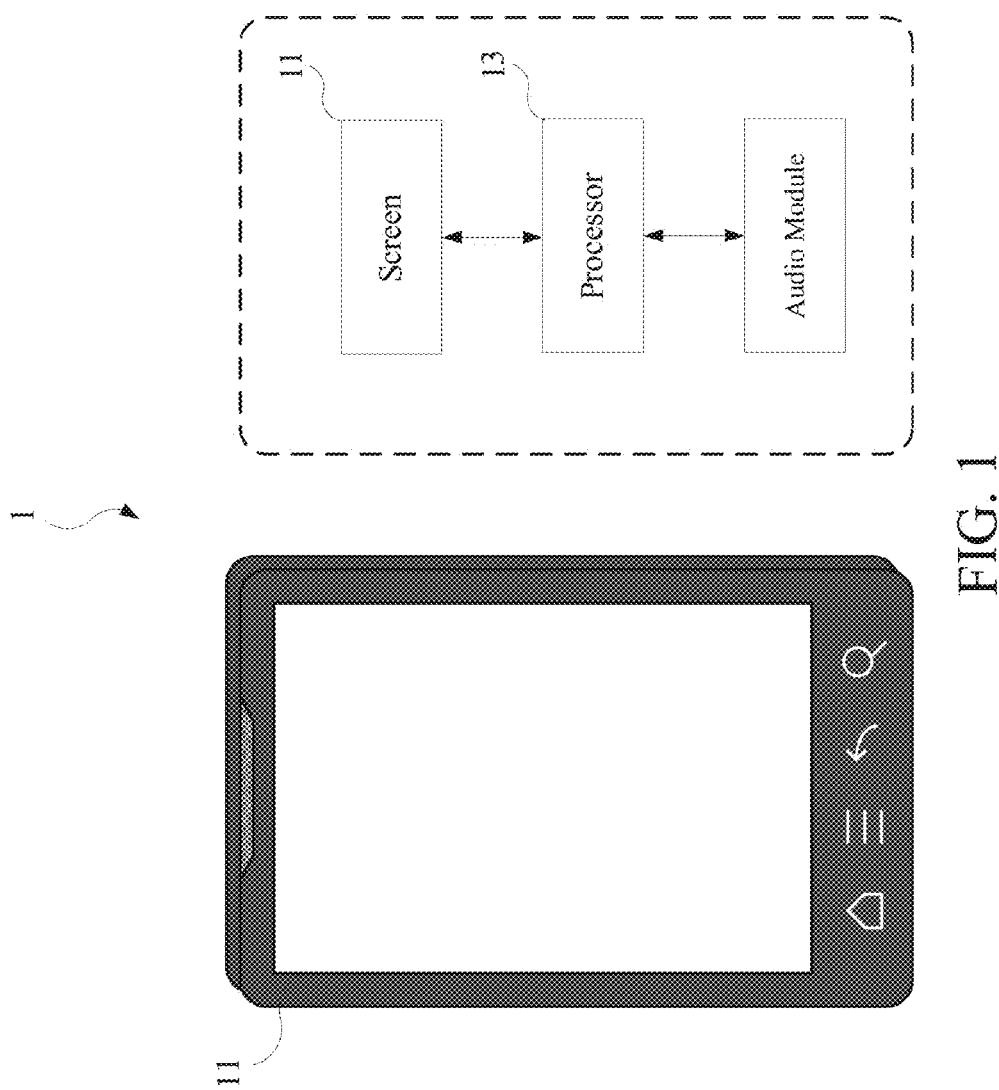
FIG. 1 is a schematic view illustrating an electronic device according to a first embodiment of the present invention.

A first embodiment of the present invention is as shown in FIG. 1, which depicts an electronic device 1. The electronic device 1 may be a smart phone as shown or some other electronic devices such as a notebook computer, a tablet computer, a personal digital assistant (PDA), a digital camera etc. As shown in FIG. 1, the electronic device 1 comprises a screen 11 and a processor 13 coupled with the screen 11. In other embodiments, the electronic device 1 may merely comprise the processor 13, and there is another device which is separate from the electronic device 1 comprises the screen 11 coupled with the processor 13.

The screen 11 may be a conventional non-touch screen or a touch screen such as a capacitive touch screen, a resistive touch screen, a resistive-capacitive composite touch screen, an electromagnetic-induction touch screen, etc. The screen 11 is configured to display music lyrics and music visualization in response to music by itself or do the same according to instructions from processor 13. The music recited in this embodiment may be provided by an audio module (not shown) comprised in the electronic device 1 or an external audio player connected with the electronic device 1. Note that the music may also be provided by any other way, and this is not intended to limit implements of the present invention.

In this embodiment, the music lyrics comprise a plurality of sentences and the screen 11 could display the sentences and the music visualization to reflect the corresponding music in three-dimensional space with time. However, the sentences of the lyrics and the music visualization may also be displayed in two-dimensional space or other multi-dimensional space according to different applications. The method in which the screen 11 displays the sentences and the music visualization is well-known to Persons skilled in the art, and thus will not be further described herein.

Each of the sentences of the lyrics may have a predefined display period and/or a predefined display position, and the screen 11 displays each of the sentences of the lyrics according to its display period and display position. In response to the display period and/or display position of each of the sentences of the lyrics, the processor 13 dynamically changes the music visualization to synchronize and coordinate the music visualization and the music lyrics so that the music visualization and the music lyrics displayed by the screen 11 could be appropriately combined to visually reflect the music. Note that the processor 13 may also dynamically change the music visualization in response to other variations of the lyrics, such as sentence length, word color, word style, language type, etc; and all these implements are included in the scope of the present invention.

In this embodiment, the music visualization comprises a plurality of visual patterns corresponding to different frequency components of the music and the processor 13 would adjust each of the visual patterns according to volume of the corresponding frequency component to change the music visualization. In addition, the music visualization may be implemented by different models such as blue sky, rainbow polka, wave wall, space, etc. Rainbow polka is applied to the music visualization as an example; however, this is not intended to limit the implements of the present invention, but only for the ease of descriptions.

In this example, the music visualization comprises three circles which respectively correspond to low, middle and high frequency components of the music. In accordance with FIG. 2, which is a schematic view illustrating variety of one of the circles in response to volume of particular frequency, the size of each of the circles is adjusted by the processor 13 according to volume of the corresponding frequency component. More specifically, the size of each of the circles increases and decreases in response to that the volume of the corresponding frequency component increases and decreases respectively. In addition, each of the circles emits shockwave D in response to that the volume of the corresponding frequency component reaches the maximum value.

The method in which the processor 13 changes the music visualization in response to the display period and the display position of each of the sentences of the lyrics will be further described hereinafter with reference to FIGS. 3A-3E and FIG. 4. FIGS. 3A-3E are schematic views illustrating the music visualization in response to different display positions of the sentences of the music lyrics, and FIG. 4 is a schematic view illustrating the display periods of the sentences of the music lyrics.

Figure 2:
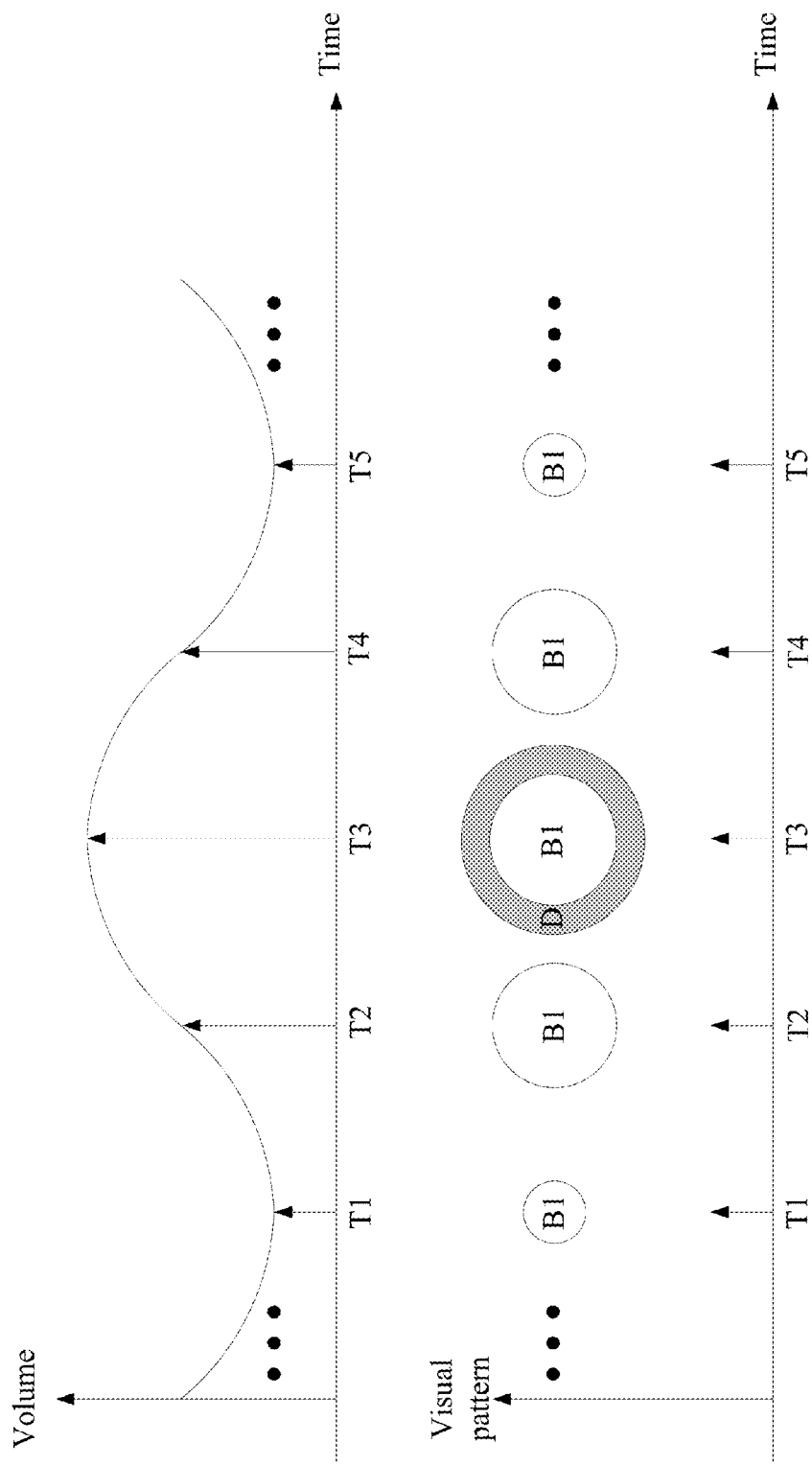
FIG. 2 is a schematic view illustrating variety of a visual pattern of the music visualization in response to volume of particular frequency according to the first embodiment of the present invention.
Figure 3A:
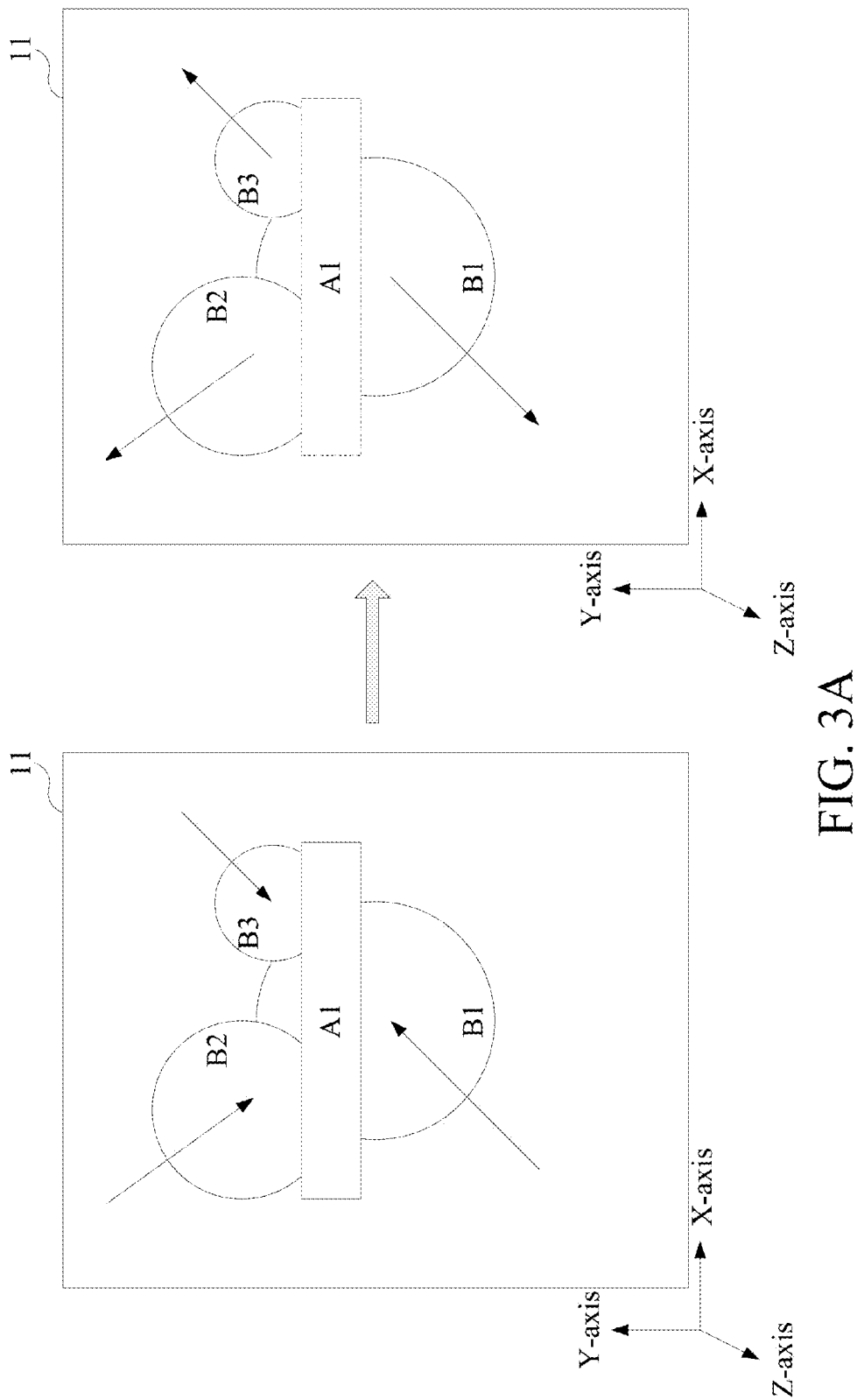
FIGS. 3A-3E are schematic views illustrating the music visualization in response to different display positions of the sentences of the music lyrics according to the first embodiment of the present invention.
Figure 4:
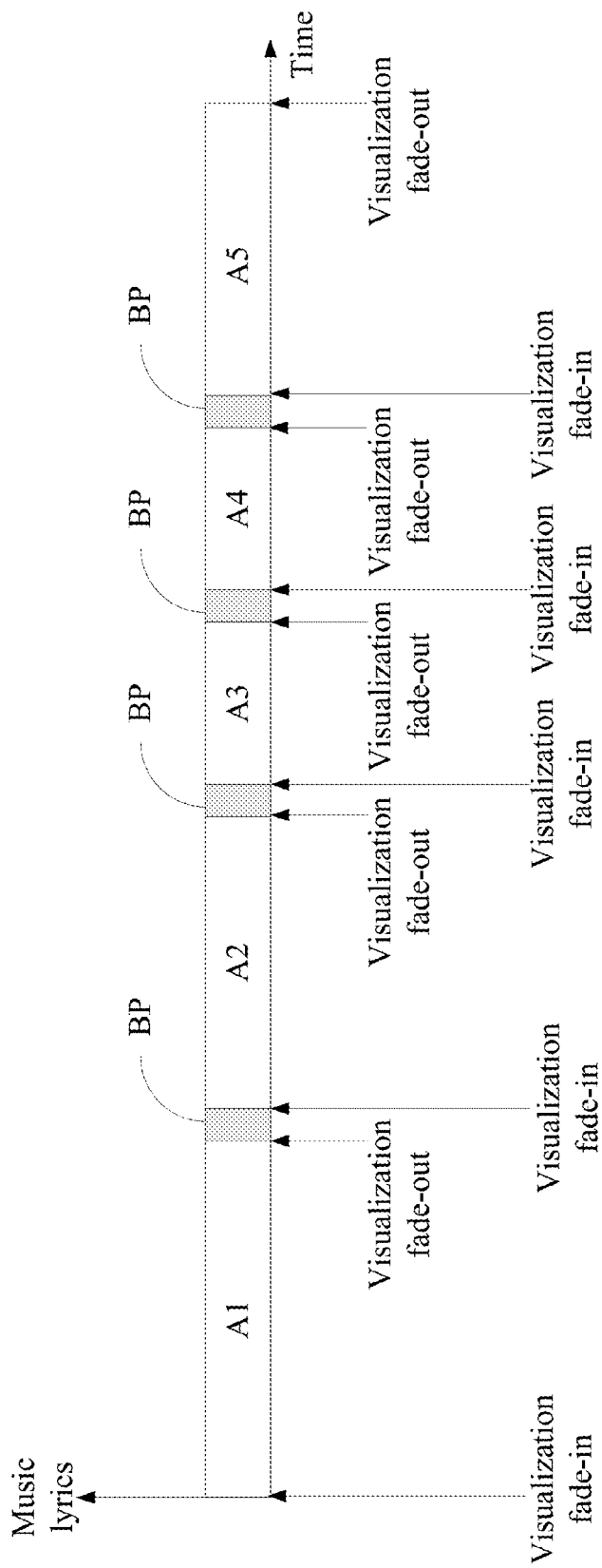
FIG. 4 is a schematic view illustrating the display periods of the sentences of the music lyrics according to the first embodiment of the present invention.

As shown in FIG. 3A and FIG. 4, when the first sentence A1 of the lyrics is just displayed on the X-Y plane of a three-dimensional space which is presented in the screen 11, the three circles B1, B2, B3 fade in together from different directions and surround the first sentence A1. Then, each of the three circles B1, B2, B3 are respectively adjusted by the processor 13 in response to volume of the corresponding frequency component as shown in FIG. 2 until the first sentence A1 disappears. Once the first sentence A1 disappears, the three circles B1, B2, B3 will fade out in opposite direction.

Figure 3B:
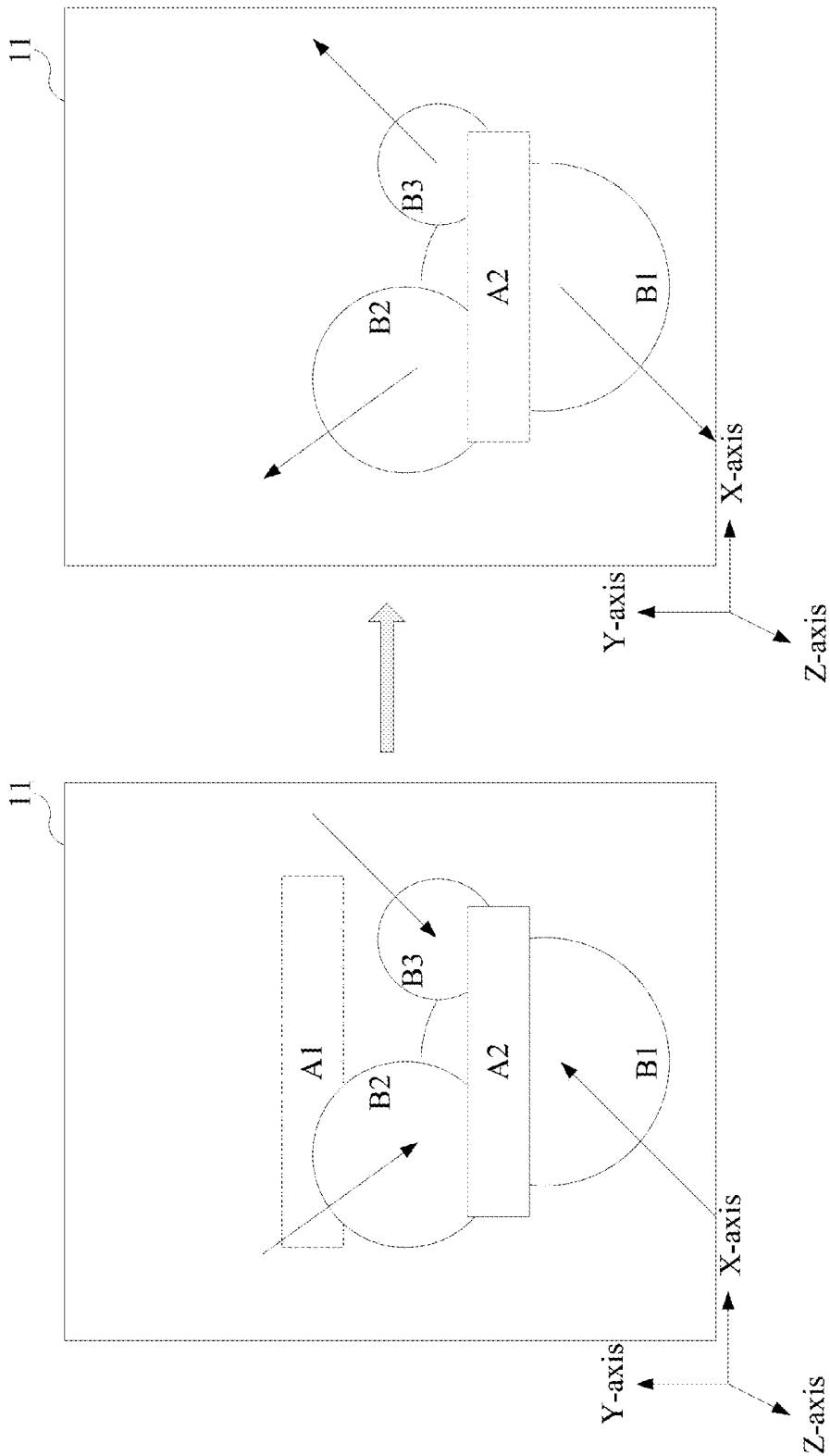

Next, as shown in FIG. 3B and FIG. 4, after a predefined buffer period BP upon the disappearance of the first sentence A1, the second sentence A2 is displayed on the X-Y plane of the three-dimensional space. The second sentence A2, however, may be immediately displayed without waiting any buffer period upon the disappearance of the first sentence A1 in another embodiment. It is assumed that the display position of the second sentence A2 is lower than that of the first sentence A1, and the display period and the sentence length of the second sentence A2 are shorter than that of the first sentence A1.

Once the second sentence A2 is displayed, the three circles B1, B2, B3 fade in together from different directions which are dependent on the display position of the second sentence A2, and surround the second sentence A2. Likewise, each of the three circles B1, B2, B3 are respectively adjusted by the processor 13 in response to volume of the corresponding frequency component as shown in FIG. 2 until the second sentence A2 disappears. Once the second sentence A2 disappears, the three circles B1, B2, B3 will fade out in opposite direction.

Figure 3C:
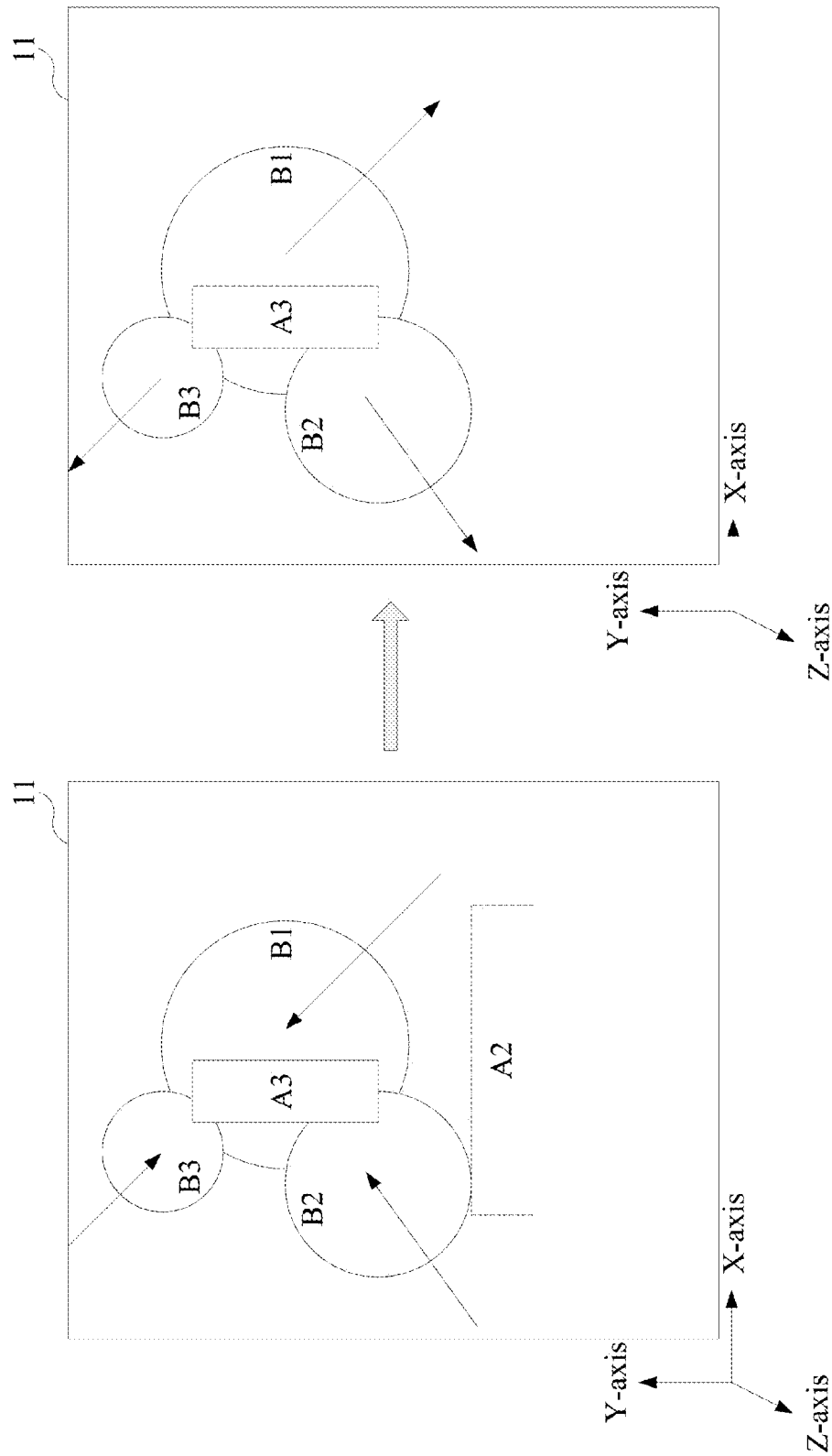

Further, as shown in FIG. 3C and FIG. 4, after another predefined buffer period BP upon the disappearance of the second sentence A2, the third sentence A3 is displayed on the X-Y plane of the three-dimensional space. It is assumed that the display position of the third sentence A3 is higher than that of the second sentence A2, and the display period and the sentence length of the third sentence A3 are shorter than that of the second sentence A2. In addition, the third sentence A3 is rotated with an angle of 90 degrees compared to the second sentence A2. In response to the third sentence A3, the screen 11 will rotate the X-Y plane with an angle of 90 degrees to match with the third sentence A3, and this will make sure that the displayed content is always comprehensible and significant to the viewer.

Once the third sentence A3 is displayed, the three circles B1, B2, B3 fade in together from different directions which are dependent on the display position of the third sentence A3, and surround the third sentence A3. Likewise, each of the three circles B1, B2, B3 are respectively adjusted by the processor 13 in response to volume of the corresponding frequency component as shown in FIG. 2 until the third sentence A3 disappears. Once the third sentence A3 disappears, the three circles B1, B2, B3 will fade out in opposite direction.

Figure 3D:
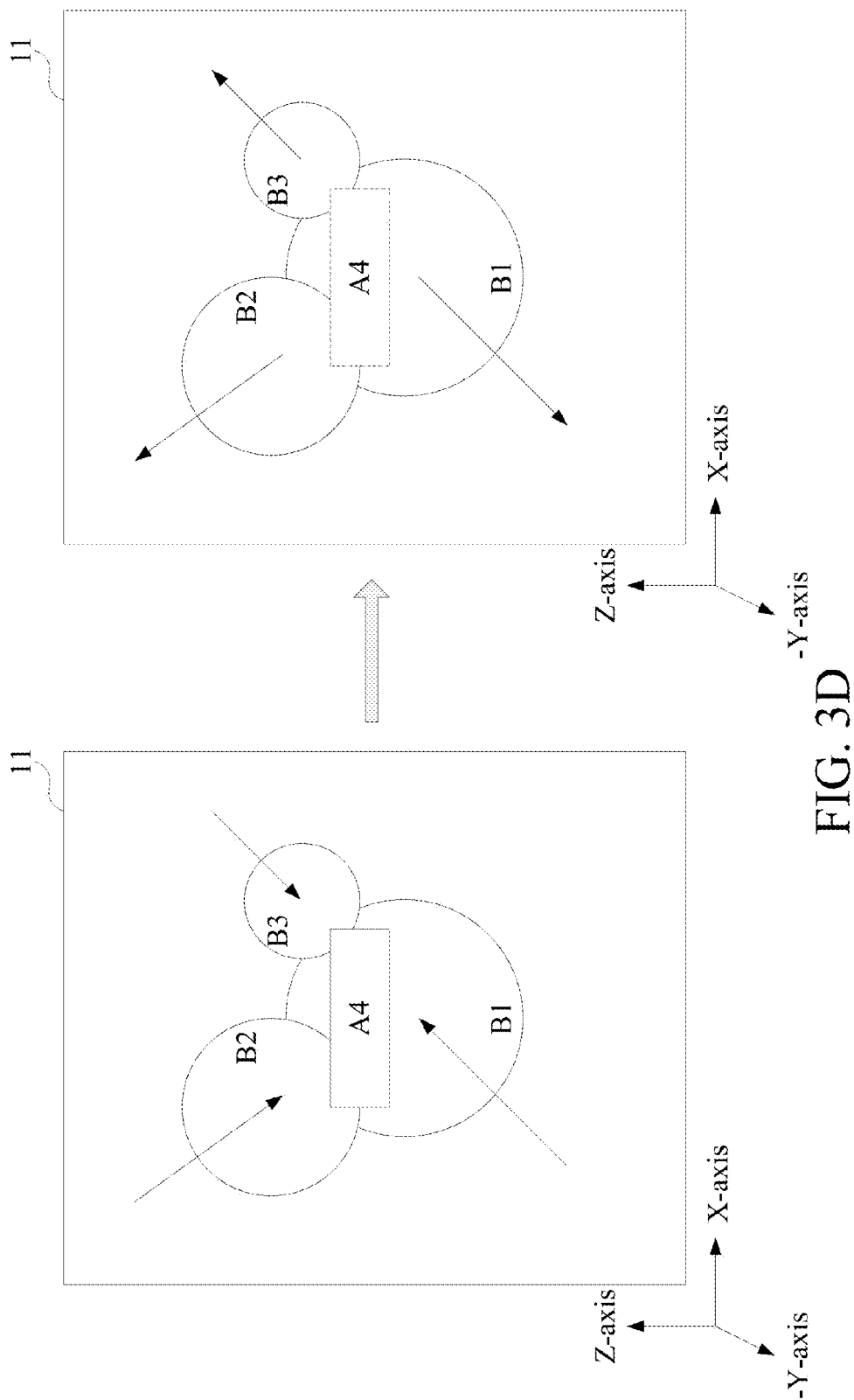

As shown in FIG. 3D and FIG. 4, after another predefined buffer period BP upon the disappearance of the third sentence A3, the fourth sentence A4 is displayed on the X-Z plane of the three-dimensional space. It is assumed that the display position of the fourth sentence A4 is on the X-Z plane rather than the X-Y plane, and the display period and the sentence length of the fourth sentence A4 is as same as that of the third sentence A3. In response to the fourth sentence A4, the screen 11 will show the X-Z plane instead of the X-Y plane to display the fourth sentence A4.

Once the fourth sentence A4 is displayed, the three circles B1, B2, B3 fade in together from different directions which are dependent on the display position of the fourth sentence A4, and surround the fourth sentence A4. Likewise, each of the three circles B1, B2, B3 are respectively adjusted by the processor 13 in response to volume of the corresponding frequency component as shown in FIG. 2 until the fourth sentence A4 disappears. Once the fourth sentence A4 disappears, the three circles B1, B2, B3 will fade out in opposite direction.

Figure 3E:
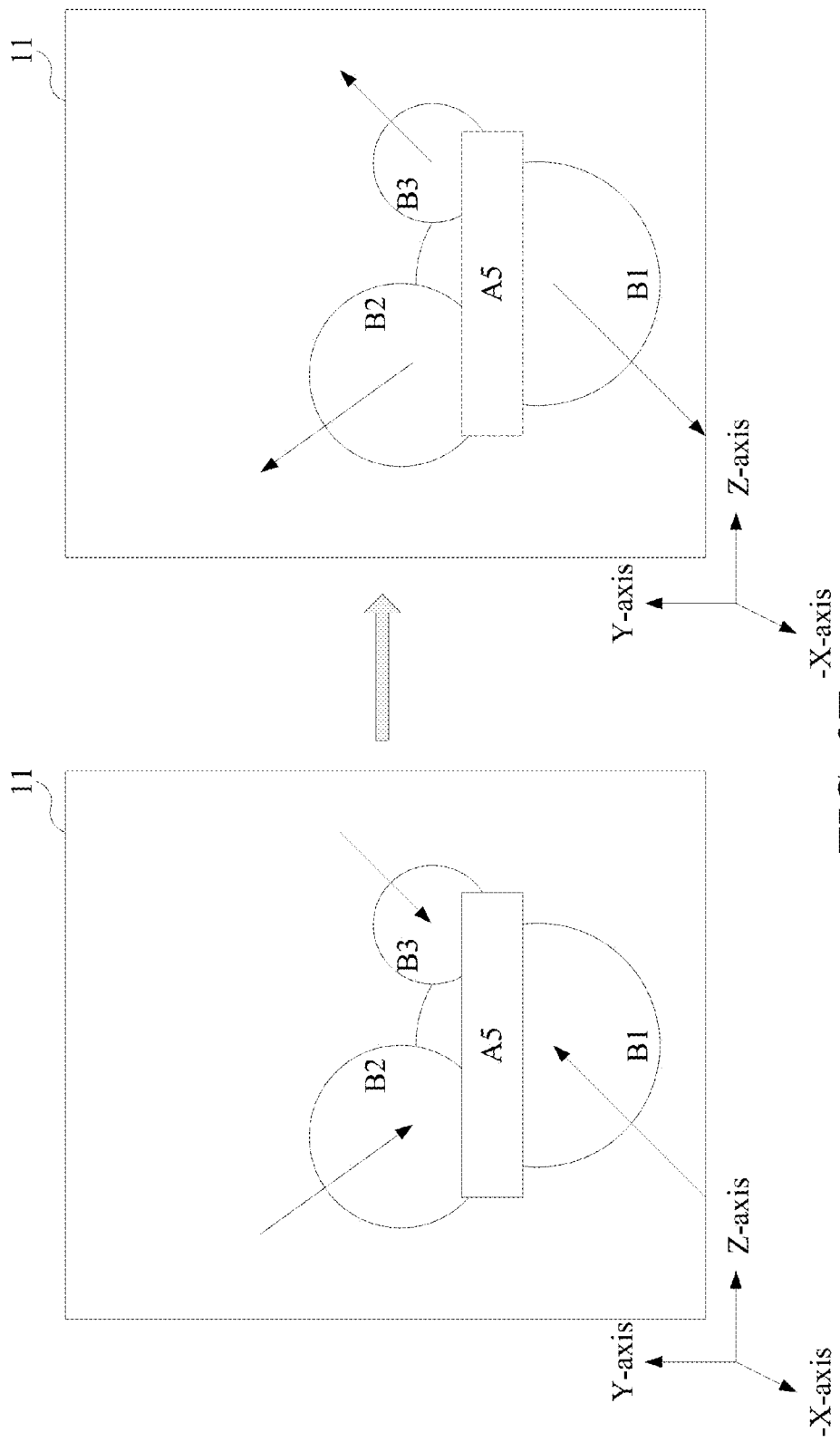

Likewise, as shown in FIG. 3E and FIG. 4, after another predefined buffer period BP upon the disappearance of the fourth sentence A4, the fifth sentence A5 is displayed on the Z-Y plane of the three-dimensional space. It is assumed that the display position of the fifth sentence A5 is on the Z-Y plane rather than the X-Z plane, and the display period and the sentence length of the fifth sentence A5 is larger than that of the fourth sentence A4. In response to the fifth sentence A5, the screen 11 will show the Z-Y plane instead of the X-Z plane to display the fifth sentence A5.

Once the fifth sentence A5 is displayed, the three circles B1, B2, B3 fade in together from different directions which are dependent on the display position of the fifth sentence A5, and surround the fifth sentence A5. Likewise, each of the three circles B1, B2, B3 are respectively adjusted by the processor 13 in response to volume of the corresponding frequency component as shown in FIG. 2 until the fifth sentence A5 disappears. Once the fifth sentence A5 disappears, the three circles B1, B2, B3 will fade out in opposite direction.

The depictions of FIGS. 3A-3E and FIG. 4 are only for the purpose of illustration rather than to limit the present invention. Persons skilled in this field may proceed with a variety of modifications and replacements based on the disclosures and suggestions as described before, and these modifications and replacements are included in the scope of the present invention as well.

Figure 5:
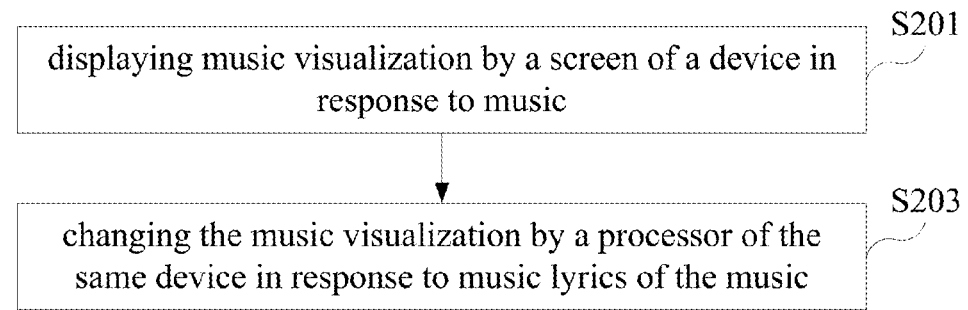
FIG. 5 is a flowchart diagram of a music visualization method according to a second embodiment of the present invention.

A second embodiment of the present invention is as shown in FIG. 5, which depicts a music visualization method. The music visualization method of this embodiment may be applied to an electronic device comprising a screen and a processor coupled with the screen, e.g., the electronic device 1 of the first embodiment. In other embodiments, the music visualization method of this embodiment may be applied to an electronic device comprising a processor and another electronic device comprising a screen coupled with the processor simultaneously.

As shown in FIG. 5, step S201 is executed to display music visualization by a screen of a device in response to music, and step S203 is executed to change the music visualization by a processor of the same device in response to music lyrics of the music. Alternately, in other embodiments, step S201 may be executed to display music visualization by a screen of a device in response to music, and step S203 is executed to change the music visualization by a processor of another device in response to music lyrics of the music.

In another embodiment of the music visualization method, the music lyrics may comprise a plurality of sentences and the screen displays the sentences and the music visualization in three-dimensional space with time. The processor may change the music visualization in response to display position of each of the sentences. Also, the processor may change the music visualization in response to display period of each of the sentences.

In another embodiment of the music visualization method, the music visualization may further comprise a plurality of visual patterns corresponding to different frequency components of the music and the processor may further adjust each of the visual patterns according to volume of the corresponding frequency component to change the music visualization.

In another embodiment of the music visualization method, the electronic device may further comprise an audio module for providing the music.

In addition to the aforesaid steps, the music visualization method of this embodiment can also execute all the operations of the electronic device 1 set forth in the first embodiment and accomplish all the corresponding functions. The method in which the music visualization method of this embodiment executes these operations and accomplishes these functions can be readily appreciated by those of ordinary skill in the art based on the explanations of the first embodiment, and thus will not be further described herein.

According to the above descriptions, the present invention provides an electronic device and a music visualization method thereof. According to the present invention, display of the music visualization is dependent on variations of display of the music lyrics, and such implement is utilized to synchronize and coordinate the music visualization and the music lyrics in response to music. In such a way, the music visualization and the music lyrics can be appropriately combined to visually reflect the music.

The above disclosure is related to the detailed technical contents and inventive features thereof. Persons skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electronic device, comprising:
a screen for displaying a music visualization in response to music; and
a processor, coupled with the screen and configured to change the music visualization in response to music lyrics of the music;
wherein the music lyrics comprise a plurality of sentences and the screen displays only one of the plurality of sentences and the music visualization in three-dimensional space within a display period corresponding to the one of the plurality of sentences;
wherein a second sentence of the plurality of sentences and the music visualization both start to be displayed on the screen as a first sentence of the plurality of sentences and the music visualization both disappear from the screen;
wherein the processor changes the music visualization in response to display position of each of the plurality of sentences changing; and
wherein the music visualization further comprises a plurality of visual patterns corresponding to different frequency components of the music and the processor further adjusts each of the visual patterns according to volume of the corresponding frequency component to change the music visualization.

2. The electronic device as claimed in claim 1, further comprising an audio module for providing the music, wherein the audio module is an internal electronic component of the electronic device utilized to provide audio.

3. A music visualization method for use in an electronic device comprising a processor, the method comprising the following steps of:
(a) displaying a music visualization by a screen in response to music; and
(b) changing the music visualization by the processor in response to music lyrics of the music;
wherein the music lyrics comprise a plurality of sentences and the screen displays only one of the plurality of sentences and the music visualization in three-dimensional space within a display period corresponding to the one of the plurality of sentences;
wherein a second sentence of the plurality of sentences and the music visualization both start to be displayed on the screen as a first sentence of the plurality of sentences and the music visualization both disappears from the screen;
wherein the processor changes the music visualization in response to display position of each of the plurality of sentences changing; and
wherein the music visualization further comprises a plurality of visual patterns corresponding to different frequency components of the music and the processor further adjusts each of the visual patterns according to volume of the corresponding frequency component to change the music visualization.

4. The music visualization method as claimed in claim 3, wherein the electronic device further comprises an audio module for providing the music, the audio module is an internal electronic component of the electronic device utilized to provide audio.

* * * * *